(12) United States Patent
Gaillard et al.

(10) Patent No.: US 7,836,915 B2
(45) Date of Patent: Nov. 23, 2010

(54) STAGGERED CYLINDERS IN A VALVE GATE APPARATUS

(75) Inventors: Patrice Fabien Gaillard, Milton, VT (US); Manon Danielle Belzile, Fairfield, VT (US); Edward Joseph Jenko, Essex Junction, VT (US)

(73) Assignee: Husky Injection Molding Systems Ltd., Bolton, Ontario (CA)

( * ) Notice: Subject to any disclaimer, the term of this patent is extended or adjusted under 35 U.S.C. 154(b) by 553 days.

(21) Appl. No.: 11/859,972

(22) Filed: Sep. 24, 2007

(65) Prior Publication Data

US 2009/0057593 A1 Mar. 5, 2009

Related U.S. Application Data

(63) Continuation-in-part of application No. 11/848,823, filed on Aug. 31, 2007, now abandoned.

(51) Int. Cl.
*F16K 1/36* (2006.01)
(52) U.S. Cl. ............... 137/637; 137/637.2; 251/324; 251/63; 251/63.5
(58) Field of Classification Search ........... 137/637.2, 137/637; 251/324, 63, 63.5, 62
See application file for complete search history.

(56) References Cited

U.S. PATENT DOCUMENTS

| 2,224,290 | A | * | 12/1940 | Corbin, Jr. ............... 137/637.1 |
| 2,729,241 | A | * | 1/1956 | Clark ..................... 137/596.13 |
| 2,784,738 | A | * | 3/1957 | Thurber, Jr. ............ 137/599.07 |
| 4,682,756 | A | * | 7/1987 | Hartwig et al. ............ 251/63.5 |
| 2004/0091566 | A1 | | 5/2004 | Olaru |

* cited by examiner

*Primary Examiner*—Kevin L Lee

(57) ABSTRACT

A valve gate piston assembly, in an injection molding system, is positioned in a staggered arrangement such that one piston assembly overlaps that of another valve gate piston assembly thereby minimizing an overall centerline pitch between said piston assemblies. Such a superposed layout of piston assemblies enables larger diameter pistons to occupy a smaller footprint than would be realized should the same piston assemblies be positioned side by side. The use of relatively larger diameter pistons results in an increased force available, for the same input air pressure, to actuate the pistons and valve stems attached thereto, resulting in a higher valve stem closing force. A staggered piston assembly layout also allows independent air circuits to control each piston separately. A combination of multiple piston assemblies may be configured in such a staggered, overlapping array.

13 Claims, 3 Drawing Sheets

STAGGERED CYLINDERS IN A VALVE GATE APPARATUS

CROSS-REFERENCE TO RELATED PATENT APPLICATION

This patent application is a continuation in part patent application of prior U.S. patent application Ser. No. 11/848,823, filed Aug. 31, 2007 now abandoned. This patent application also claims the benefit and priority date of prior U.S. patent application Ser. No. 11/848,823, filed Aug. 31, 2007 now abandoned.

TECHNICAL FIELD OF THE INVENTION

The present invention generally relates to, but is not limited to, injection molding systems, and more specifically to multiple valve gate piston assemblies.

BACKGROUND

It is commonly known, by a person having ordinary skill in the art, that there are, generally, two methods of gating in an injection molding system, and more particularly, in a hot runner system. The first type is a thermal gate or hot tip gate, which relies on a heated nozzle tip to be collocated inside a mold gate insert. When molten resin is injected, under pressure, through the hot runner system, terminating at the hot tip, the resin is forced into a mold cavity via a narrow aperture in the gate insert, namely the gate. When the mold cavity is packed full of resin, injection pressure is configured to maintain equilibrium between the pressures in the cavity as well as within the hot runner for a duration known as the hold and pack time. While the resin in the hot runner is maintained in a molten state during the entire molding process via various heaters installed therein, the mold gate insert and mold cavity are kept cooled to a temperature significantly lower than that of the hot tip in an effort to solidify the molded article as quickly as possible. In addition to the molded article solidifying in the mold cavity, a portion of the resin in the gate area where the nozzle tip resides also solidifies resulting in a slug. This slug remains behind, in the gate insert, when the mold opens and the molded article is ejected from its cavity, thereby precluding the flow of molten resin from the gate area. The slug is subsequently injected into the mold cavity with the next wave of pressurized, molten resin. The total time taken for the mold cavity to be filled, and the molded article to solidify and be ejected from the mold, is called the cycle time. The cycle time is greatly affected by the length of time it takes both the slug and the molded article to cool and solidify. The hot tip is juxtaposed within the cooled gate insert; thus, the slug must cool sufficiently such that ejection of the molded article does not pull a 'string' of still molten resin from the gate area. Further, the molded article must cool sufficiently such that the ejection process from the mold will not damage it. The longer time the molded article must remain in the mold for the above-mentioned reasons, the cycle time is increased resulting in less molded articles being produced for any given timeframe, resulting in unrealized revenue by the molder. Additionally, a small 'vestige' or remnant of resin still remains on the ejected molded article at the gate area which is usually undesirable and must be either covered up by a label or the like, or manually trimmed off, resulting in increased cost per molded part. Furthermore, if the cold slug is not totally remelted upon entry into the subsequent molded article, it can result in a cosmetic blemish or worse yet, a potential mechanical defect resulting in rejection of the molded article.

To overcome the many drawbacks of thermal gate design, as described above, purchasers turn to valve gating designs. A typical valve gate mechanism consists of a piston, reciprocating inside a cylinder which may be either pneumatically or hydraulically actuated. Alternatively, a mechanically or electrically actuated system may be employed. Attached to said piston is a valve stem which extends coaxially along the center of at least one portion of the resin melt channel in the hot runner, nozzle and/or nozzle tip, culminating in the mold gate area, in the closed position. To inject resin into the mold cavity, the piston, and hence the valve stem, is actuated to retract the valve stem from a position in the gate area so as not to restrict resin flow through the gate area. The molten resin is then injected under pressure to fill the mold cavity. Once the mold cavity is packed with resin, the injection pressure is stabilized and the piston is activated to translate the valve stem to its full forward position where the tip of the valve stem mates with, and closes off, the gate. The geometry of the tip of said valve stem is approximately sized to match that of the gate insert, such that the flow of resin is mechanically shut off completely and additionally such that the tip of the valve stem protrudes slightly into the mold cavity and hence the molded article itself. The purpose of this latter function is to eliminate any vestige or post left on the molded article, again which is undesirable from a molded article quality perspective. Since the valve stem acts to mechanically sever the resin in the gate area from the molded article, no time is required for cooling of a slug to eliminate resin stringing, but only that of the molded article itself for the purpose of a harmless ejection, and consequently, there is no slug to be forced into the mold cavity on the subsequent injection cycle.

As described previously, the piston and valve stem arrangement may be either pneumatically or hydraulically actuated, but it may be appreciated that while a hydraulic system is capable of generating very high pressures, it has the potential of leakage of hydraulic fluid and is more costly to install and maintain. Comparably, air is relatively inexpensive, operates at a lower and safer pressure, is cleaner and does not require as robust an installation a hydraulic system. For these reasons, pneumatic valve stem actuation systems are preferred, but in order to achieve higher valve stem closing forces, given a standard, readily available shop air pressure, generally between 80 and 120 pounds per square inch, a relatively large diameter piston must be used. A higher than normal valve stem force is required in instances when the injection pressure needed to completely fill the molded article is excessively high and so an equally high force is required to move the valve stem to the forward position to close the gate against the pressure of the resin in the molded article. Other examples where higher valve stem closing forces are necessary are when molding with high viscosity resins or with resins containing fillers such as carbon or glass fibers or the like. In these particular cases, if the valve stem does not have sufficient force to fully engage and close off the gate, the result will be a highly undesirable 'crown' or 'post' of resin protruding above the surface of the molded article.

The traditional solution to augmenting the valve stem closing force is to utilize a piston of a sufficiently large diameter which will achieve the necessary valve stem closing force for the same available air pressure. The conventional arrangement of valve gate piston cylinders in a hot runner is a side-by-side configuration, with the minimum center-to-center pitch between each piston cylinder being slightly greater than the diameter of one piston cylinder. However, should larger diameter pistons be necessary for higher valve stem closing forces, this arrangement necessitates increasing the pitch of the pistons respectively. The drawback of this natural progression of higher stem force requiring larger pistons resulting in larger pitch spacing between pistons is that it precludes the mold design from optimizing the number of molded articles able to be fitted in one hot runner mold, since the molded article may be significantly smaller than the pitch required between piston cylinders, which, in turn, impacts realized molded article production quantities. Another instance where an increased piston pitch can be detrimental in mold design is the case where multiple gates per molded article are necessary and a close proximity of gates is required to fit the geometry of the molded article. In both instances described above, a sufficiently small diameter piston may optimize the mold design spatially, but be inherently insufficient to produce enough stem closing force to overcome the nature of the resin or injection pressures.

One method and design of achieving multiple valve stems positioned in a close pitch configuration, yet activated with sufficient force, is to attach numerous valve stems to one large piston. While this may gain the advantage of air pressure acting on a large surface area of the piston and the potentially close proximity of valve stems, it does not offer the advantage of independent and/or sequential valve stem control. Sequential valve stem control is most advantageous when molding one article with multiple gates in order to optimize the resin filling and flow characteristics in said molded article, and can only be realized when each valve stem is actuated via a single piston fed by a dedicated air circuit. This arrangement allows for filling of a single, multi gated, molded article with molten resin using both the upper and the lower valve stems but sometimes with one valve stem slightly delayed in opening from the other valve stem to effectively manipulate the resin weld line. Valve stem timing is varied to move the weld line to a location of preference for reasons of strength or appearance of the molded article.

For the foregoing reasons, there is a need for an injection molding device and method of molding multiple, separate articles arranged in a close pitch array or having numerous, closely spaced gates per article, which may be sequentially filled, and have high quality gates.

SUMMARY

The present invention is directed to a device that comprises a plurality of valve gate pistons arranged in a staggered fashion in a cylinder block, the cylinder block designed to house at least the lower piston while having dedicated air passages sealed therein to enable air to activate the lower piston and a bore therethrough for passage of the adjacent valve stem. The pistons are configured in such a way that an upper piston overlaps a lower piston, the upper piston and lower piston each having a valve stem coupled thereto such that each piston and valve stem assembly reciprocate together. A cover plate attached to the top of the cylinder block encloses the lower piston bore such that air fed to the bore, both above and below the lower piston, will activate the lower piston, the cover plate also supporting the upper piston cylinder and upper piston and having an orifice therethrough for passage of the valve stem. A backing plate functions to enclose the upper piston cylinder such that air delivered via the backing plate will activate the upper piston as well as the lower piston via the cover plate.

In one aspect of the present invention, a plurality of backup pads are located between the cylinder blocks and the manifold, each backup pad surrounding a respective manifold bushing, such that the conduction of heat from the manifold to the cylinder block is minimized.

In another aspect of the present invention, one common backup pad is located between the cylinder block and the manifold and is mounted atop multiple manifold bushings such that the conduction of heat from the manifold to the cylinder block is minimized.

In yet another aspect of the present invention, the cylinder block is configured to have an integral cover plate such that a bore therein secures a lower piston cylinder whereby air delivered via the backing plate will activate the lower piston.

The present invention provides the ability to utilize pneumatic actuation of large pistons to yield sufficiently high valve stem forces to overcome high injection pressure and the resistance of filled or viscous resins when the molded article gate locations are spaced close together by more efficiently using available space by staggering the piston such that they overlap one another. Additionally, each piston may be sequentially activated through the use of individual pneumatic air circuits.

These and other features, aspects, and advantages of the present invention will become better understood with regard to the following description, appended claims and accompanying drawings.

DETAILED DESCRIPTION

Figure 1:
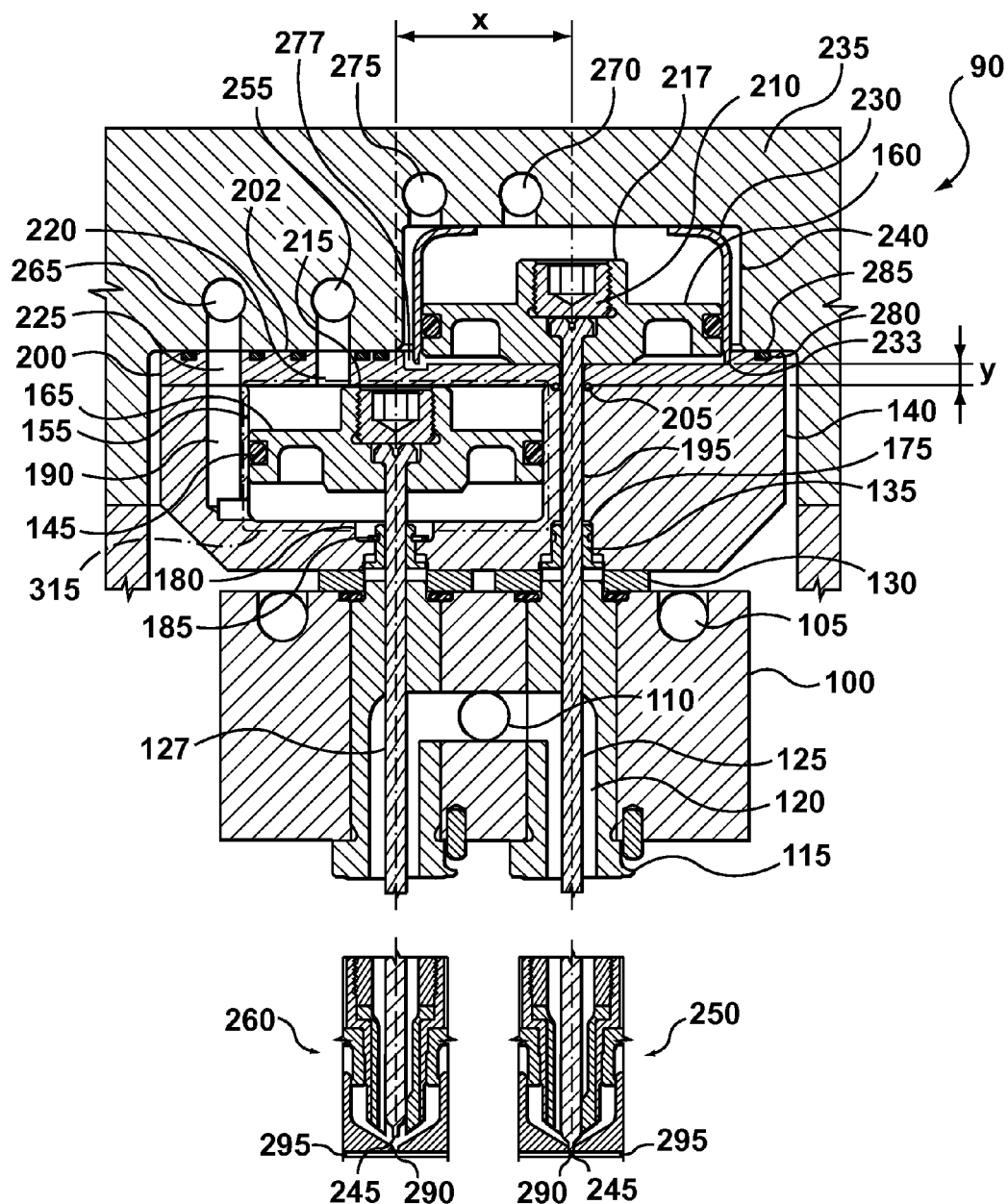
FIG. 1 is a cross-sectional view of a valve gate assembly showing a plurality of staggered pistons wherein valve stems are in forward and retracted positions.

Referring now initially to FIG. 1, a valve gate piston assembly 90 of a hot runner injection molding apparatus, in accordance to the present invention, is illustrated. The components shown are not a complete representation of the entire hot runner, but rather only those necessary to convey the intention of the present invention. For clarity, the arbitrary directions of up and down, and assignments of upper and lower have been adopted, though it may be appreciated by those skilled in the art that, in use, the hot runner system may not necessarily be oriented in this fashion.

A manifold 100, heated via inset heaters 105, is used to convey resin in a molten state, by way of melt channels 110 contained therein. Manifold bushings 115 are installed through the manifold in a manner such that their axes are collinear with the gate orifice 290. The proximity of the manifold bushings 115, and hence the nozzle stack and gate orifice 290 location, is determined by the diameter of the piston cylinders 230. A minimal centerline pitch 'X' is achieved by staggering placement of one piston cylinder 230 above another with sufficient clearance 'Y' to contain air and support the constant impact of the upper piston 160 and lower piston 165 against a cover plate 200, as in FIG. 1, or cylinder bore 240, as in FIG. 2. A distance between centerlines, 'X', of a first valve stem 125 and a second valve stem 127 is determined essentially by half the piston cylinder 230 diameter plus half the first valve stem 125 diameter, including sufficient wall thickness 232, to locate valve stem bore 195 so as not to interfere with the airtight piston bore 155 or cylinder bore 240. A projected area 300 of the upper piston 160 overlapping a projected area 310 of the lower piston, shown in FIG. 3, illustrates the reduced center to center distance, 'X'. This technique of overlapping the piston cylinders 230 thus also allowing a minimum distance 'X' to be realized between gate orifices 290 is fundamental to locating multiple nozzles in close proximity to each other to inject molten resin in several locations on one molded article 295 or to a plurality of individual molded articles 295 which are closely collocated to optimize mold layout. This staggered arrangement also facilitates the use of larger piston cylinders 230 within the same footprint as if smaller diameter piston cylinders 230 were placed side by side, thereby offering a fourfold increase in the valve stems' 125, 127 closing force. The distance 'X', previously described as a minimum distance between piston centerlines, may also be customized by a factor of 'X' depending on mold layout. This staggered piston design will apply for all pitches between the minimum, and two times 'X'. At any pitch greater than 'X' times two, staggered pistons 160, 165 would be replaced with conventional side by side pistons.

Melt passages 120 in the manifold bushings 115 are in fluid communication with the melt channels 110 in the manifold 100 such that resin may be diverted at an angle within the manifold bushing 115 to direct flow ultimately to the gate orifice 290. In addition to redirecting the flow of molten resin, another function of the manifold bushing 115 is to guide the valve stems 125, 127.

In FIG. 1, a backup pad 130 surrounds a manifold bushing neck 135 for the purpose of standing off and insulating a cylinder block 140 from the manifold 100. The backup pad 130 is made from a material which is preferably less thermally conductive than that of the manifold 100 in an effort to keep the cylinder block 140 relatively cooler than the manifold 100. By minimizing the amount of heat transferred from the manifold 100 to the cylinder block 140, the life of the piston seals 145 is prolonged and the wicking effect of resin weepage being drawn up the manifold bushing neck 135 is lessened.

Figure 2:
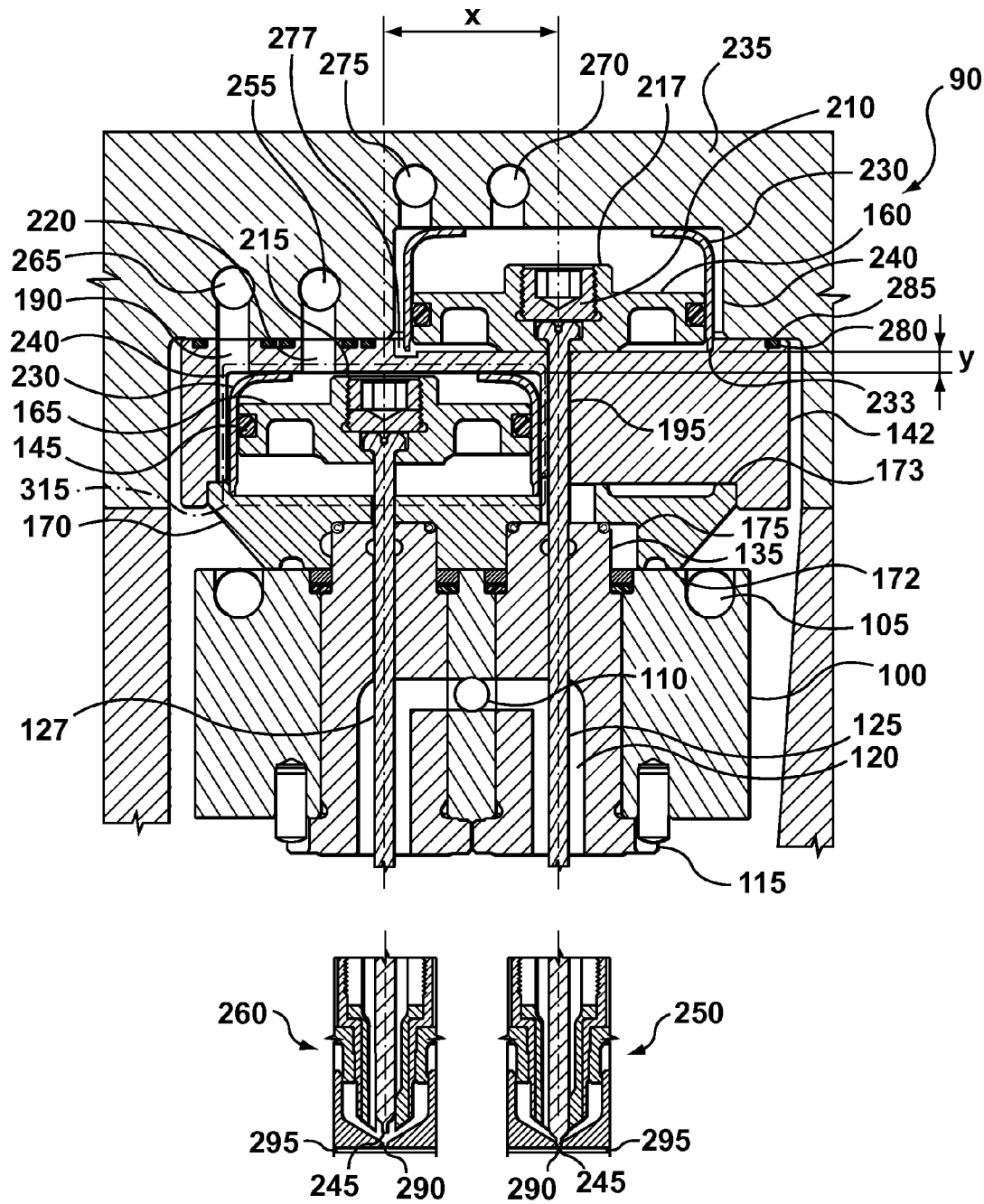
FIG. 2 is a cross-sectional view of the valve gate assembly showing a plurality of staggered pistons having a one piece backup pad and a cover plate which is an integral portion of the cylinder block.
Figure 3:
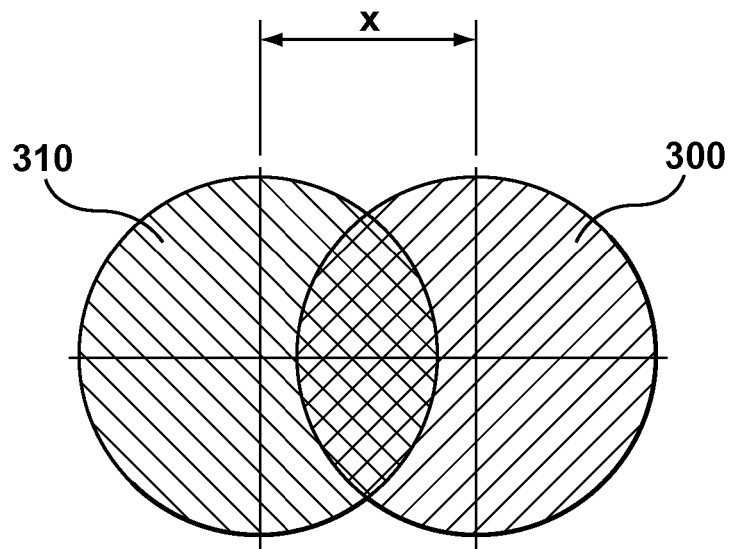
FIG. 3 is a plan view representation showing overlapping projected areas of the pistons.
Figure 4:
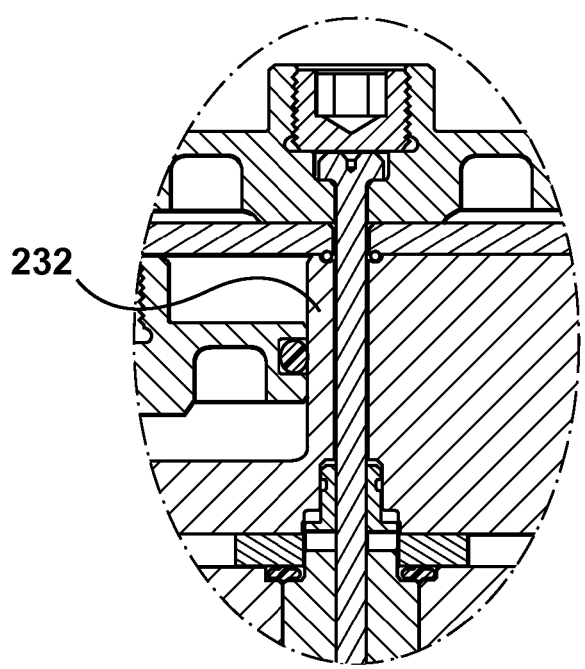
FIG. 4 is an isolated view showing detail of the cylinder block, particularly the wall between the piston bore and valve stem bore.

In an alternative embodiment, FIG. 2, a backup pad 170 may support a plurality of manifold bushings 115. In this configuration, the cylinder block 142, resting on the integral backup pad 170, may support a plurality of piston cylinders 230. The integral cylinder block 142 also includes a cylinder bore 240 to house the piston cylinder 230 when it is installed in the lower position.

In FIG. 1, the cylinder block 140 is aligned to the manifold bushings 115 via bores 175. Internally to the cylinder block 140, in the center bottom of the piston bore 155, a recess 180 is provided in the cylinder block 140 to allow for a coupler 185, such as a clip, to attach to the manifold bushing neck 135 as a means for securing the cylinder block 140 thereto in the interest of ease of maintenance and assembly.

The cylinder block 140 is configured to have a piston bore 155 for reciprocating travel of the lower piston 165 which is open above said piston for installation and maintenance access. A first passage 190 is drilled in the cylinder block 140 to provide air to the underside of the lower piston 165 to cause it to move upward. A valve stem bore 195 is through the cylinder block 140 to allow valve stem 125 to pass therethrough. Said bore 195 is sealed at the mating surface between the cylinder block 140 and the cover plate 200 to prevent air leakage up the valve stem bore 195 using sealing member 205, such as an o-ring.

Each piston 160, 165 has a valve stem 125, 127, installed therein, the valve stems 125, 127 being removably coupled to the pistons 160, 165 via a fastener 210, such as a set screw.

Therefore, when the lower piston 165 strokes up and down in the piston bore 155, the corresponding first valve stem 125 also travels the same distance. The first valve stem 125 will be longer than the second valve stem 127, by nature of the overlapping piston cylinder arrangement, and is dependent upon such factors as piston 160, 165 geometry and the clearance 'Y' between the piston cylinders 230.

The uppermost stroke of the lower piston 165 is determined by the lower piston top 215 striking the cover plate 200 in FIG. 1, or the underside of cylinder bore 240, in FIG. 2, just as the uppermost stroke of the upper piston 160 is determined by the upper piston top 217 striking the underside of cylinder bore 240 in the backing plate 235. The cover plate 200 in FIG. 1 is mounted to the cylinder block 140 with aligning components, such as dowels, and fasteners, such as screws, and serves to provide a back stop for the lower piston top 215.

A second passage 220 above the lower piston 165 allows for air to enter the piston bore 155 forcing the lower piston 165 downward. Conversely, a third passage 225 through the cover plate 200 is in fluid communication with first passage 190 in the cylinder block 140, allowing air to cause the lower piston to move upward. Additionally, the cover plate 200 supports and locates the piston cylinder 230 which houses the upper piston 160.

A backing plate 235 at least partially houses the piston cylinder 230 inside a cylinder bore 240 by compressing it against the cover plate 200 to contain air therein to activate the upper piston 160. The backing plate 235 feeds air to both the upper piston 160 and the lower piston 165 for their, reciprocating actuation and accomplishes this via dedicated passages drilled in the plate which terminate at particular locations in and around the piston bores. To cause the lower piston 165 to move the second valve stem 127 and a stem tip 245 to the gate closed position 250, pressurized air is introduced through the lower piston forward passage 255. To cause the lower piston 165 to move the second valve stem 127 and the stem tip 245 to the gate open position 260, pressurized air is introduced through the lower piston retract passage 265. To cause the upper piston 160 to move the first valve stem 125 and the stem tip 245 to the gate closed position 250, pressurized air is introduced through the upper piston forward passage 270. And to cause the upper piston 160 to move the valve stem 125 and the stem tip 245 to the gate open position 260, pressurized air is introduced through the upper piston retract passage 275, via a plurality of feeder holes 277 to the underside of upper piston 160. It may be noted that lower piston forward passage 255 is in fluid communication with second passage 220 and that lower piston retract passage 265 is in fluid communication with third passage 225. To ensure all air passage connections and bores are hermetically sealed, each is surrounded by a groove 280 for receiving a seal 285, such as an o-ring.

In operation, when the valve stems 125, 127 are cycled back and forth via pneumatic actuation of the pistons 160, 165; it causes the stem tip 245 to move in and out of the gate orifice 290. For example, the piston 165 in the down, fully forward or closed position 250 results in the stem tip 245 residing in the gate orifice 290 sealing off flow of pressurized, molten resin to the molded article 295 via an intimate fit between the stem tip 245 and the gate orifice 290. Similarly, a piston 165 in the up, fully retracted or open position 260 pulls the stem tip 245 out of the gate orifice 290 with sufficient clearance such that molten, pressurized resin can flow without obstruction through the gate orifice 290 into the molded article 295.

Description of the embodiments of the present inventions provides examples of the present invention, and these examples do not limit the scope of the present invention. It is to be expressly understood that the scope of the present invention is limited by the claims. The concepts described above may be adapted for specific conditions and/or functions, and may be further extended to a variety of other applications that are within the scope of the present invention.

Having thus described the embodiments of the present invention, it will be apparent that modifications and enhancements are possible without departing from the concepts as described. Therefore, what is to be protected by way of letters patent are limited by the scope of the following claims:

What is claimed is:

1. A valve gate apparatus comprising:
a plurality of pistons, staggeredly arranged;
wherein the plurality of pistons includes at least an upper piston and a lower piston;
wherein the upper piston is positioned above the lower piston;
a projected area of the upper piston overlapping a projected area of the lower piston;
a first valve stem; joined to the upper piston, such that the upper piston and the first valve stem travel operatively, in unison; and
a second valve stem, joined to the lower piston, such that the lower piston and the second valve stem travel operatively, in unison,
wherein a wall thickness between a piston bore, or a cylinder bore, and a valve stem bore, is sufficient to rigidly support the lower piston or a piston cylinder and house them in an airtight chamber within a cylinder block,
further including a cover plate, operatively mounted to a top of the cylinder block, which encloses the piston bore, such that when air is fed via a second passage through said cover plate, above the lower piston, said lower piston moves downward.

2. The valve gate apparatus according to claim 1, wherein air fed via a third passage, through the cover plate, in fluid communication with a first passage in the cylinder block, moves the lower piston in at least an upwardly direction.

3. The valve gate apparatus according to claim 1, wherein the valve stem bore is through the cylinder block, proximate to the piston bore, to facilitate movement of the first valve stem.

4. A valve gate apparatus comprising:
a plurality of pistons, staggeredly arranged;
wherein the plurality of pistons includes at least an upper piston and a lower piston;
wherein the upper piston is positioned above the lower piston;
a projected area of the upper piston overlapping a projected area of the lower piston;
a first valve stem, joined to the upper piston, such that the upper piston and the first valve stem travel operatively, in unison; and
a second valve stem, joined to the lower piston, such that the lower piston and the second valve stem travel operatively, in unison,
wherein said valve gate apparatus is operatively mounted to a manifold via a plurality of manifold bushings,
further comprising:
a plurality of backup pads, positioned between the manifold and a cylinder block.

5. The valve gate apparatus according to claim 4,
wherein said plurality of backup pads insulates conductive heat emitted by the manifold to the cylinder block,
wherein the plurality of backup pads are less thermally conductive than the manifold.

6. The valve gate apparatus according to claim 4, wherein a cylinder block has a plurality of manifold bushing mounting bores configured to engage and coaxially align with a plurality of manifold bushing necks, such that the first valve stem and the second valve stem will freely reciprocate therethrough.

7. A valve gate apparatus comprising:
a plurality of pistons, staggeredly arranged;
wherein the plurality of pistons includes at least an upper piston and a lower piston;
wherein the upper piston is positioned above the lower piston;
a projected area of the upper piston overlapping a projected area of the lower piston;
a first valve stem, joined to the upper piston, such that the upper piston and the first valve stem travel operatively, in unison; and
a second valve stem, joined to the lower piston, such that the lower piston and the second valve stem travel operatively, in unison,
wherein said valve gate apparatus is operatively mounted to a manifold via a plurality of manifold bushings,
further comprising:
a backup pad positioned between the manifold and a cylinder block, and said backup pad is a unitary structure and mates with the plurality of manifold bushings.

8. The valve gate apparatus according to claim 7, wherein said backup pad insulates conductive heat emitted by the manifold to the cylinder block.

9. The valve gate apparatus according to claim 8, wherein the backup pad is less thermally conductive than the manifold.

10. A valve gate apparatus comprising:
a plurality of pistons, staggeredly arranged;
wherein the plurality of pistons includes at least an upper piston and a lower piston;
wherein the upper piston is positioned above the lower piston;
a projected area of the upper piston overlapping a projected area of the lower piston;
a first valve stem, joined to the upper piston, such that the upper piston and the first valve stem travel operatively, in unison; and
a second valve stem, joined to the lower piston, such that the lower piston and the second valve stem travel operatively, in unison,
further including a backing plate, configured to have a plurality of passages, for pneumatic operation of the upper piston and of the lower piston to enable their independent, reciprocating movement.

11. A valve gate apparatus comprising:
a plurality of pistons, staggeredly arranged;
wherein the plurality of pistons includes at least an upper piston and a lower piston;
wherein the upper piston is positioned above the lower piston;
a projected area of the upper piston overlapping a projected area of the lower piston;
a first valve stem, joined to the upper piston, such that the upper piston and the first valve stem travel operatively, in unison; and
a second valve stem, joined to the lower piston, such that the lower piston and the second valve stem travel operatively, in unison,
wherein a cover plate is configured to accept a base of a piston cylinder, into a bore causing said piston cylinder to concentrically align the upper piston with the bore and valve stem to align coaxially with a gate orifice.

12. The valve gate apparatus according to claim 11, wherein the cover plate has a plurality of grooves, concentric to a plurality of passages, and a cylinder bore, wherein each of a plurality of grooves receives a seal to prevent air leakage.

13. The valve gate apparatus according to claim 12, wherein each seal is compressed by a backing plate abutting an upper surface of the cover plate to seal the plurality of passages, and the cylinder bore to prevent air leakage.

* * * * *